United States Patent

[11] 3,627,994

[72] Inventors Max E. Sallach
Chesterland;
Russell A. Hansen, Chardon; Donald N. Heisner; Bryce G. Thornton, both of Mentor; Charles F. Weber, Euclid, all of Ohio

[21] Appl. No. 882,935
[22] Filed Dec. 8, 1969
[45] Patented Dec. 14, 1971
[73] Assignee Addressograph-Multigraph Corporation
Cleveland, Ohio

[54] CODE SENSING DEVICE FOR CIRCUIT CONTROL
7 Claims, 8 Drawing Figs.

[52] U.S. Cl. .......... 235/61.11 C, 200/46, 340/149 A, 235/61.7
[51] Int. Cl. .......... G06k 7/04
[50] Field of Search .......... 235/61.112, 61.113, 61.11, 61.111, 61.115, 61.7 B; 179/90 CS; 200/46; 340/149 A

[56] References Cited

UNITED STATES PATENTS

| | | | |
|---|---|---|---|
| 2,517,984 | 8/1950 | Cunningham | 235/61.11 |
| 2,819,020 | 1/1958 | Baer et al. | 235/61.11 |
| 2,939,631 | 6/1960 | Burstein et al. | 235/61.7 |
| 3,066,863 | 12/1962 | Wilson | 235/61.11 |
| 3,069,496 | 12/1962 | Blinken et al. | 235/61.11 |
| 3,433,932 | 3/1969 | Rolke | 235/61.11 |
| 3,514,754 | 5/1970 | Schwend | 235/61.11 |

OTHER REFERENCES

" Credit Card Reader," by Bowers et al., IBM Tech. Discl. Bull., Vol. 9, No. 12, dated May 1967, pp. 1760– 1761.

*Primary Examiner*—Thomas A. Robinson
*Attorneys*—Russell L. Root and Ray S. Pyle

ABSTRACT: A device for sensing physical variations of a data card surface includes a carriage for retaining and transporting a data card through a sensing cycle. The carriage is movable in a path from a home position to an actuated position and back to the home position. Sensing means is provided adjacent the carriage path and is urged into contact with the data card surface in response to movement of the carriage from the actuated to the home position. The sensing means establishes a circuit control, as a function of detecting the surface variations on the data card, for directly controlling, for example, a remote station information center or the like.

CODE SENSING DEVICE FOR CIRCUIT CONTROL

PRIOR ART

Refer to Sallach U.S. Pat. No. 3,470,358 for a related invention.

BACKGROUND OF THE INVENTION

The present invention relates to a device for sensing data from a storage device and, more specifically, to a data input terminal for a system in which surface variations of a mechanical storage media are sensed and the data transmitted to a remote station information center such as a computer.

Business machine cards for data storage are well known, and plastic credit or identification cards are now often embossed or otherwise marked and conditioned to carry coded data which may be imprinted directly upon a form, to be read therefrom by a sensing device.

SUMMARY OF THE INVENTION

The present invention has for its basic premise and object the concept of using a permanent source, such as a customer's credit card, as a means for directly controlling a remote station information center or record container, without an intervening imprint, and for doing so by means of sturdy, simple, low-cost sensing equipment of such nature that its use at many locations by unskilled operators is practical and economically feasible.

An example of the utility of this invention as a data input terminal is in the area of employee attendance recording. Thus, each employee is provided with an embossed plastic card properly encoded. The card is inserted in the data input terminal and immediately the data from the card are sensed and transmitted to a compiler. In the case of an employee, his number, time of arrival, date, transaction type and station location are recorded. He retains the card and uses it for other reporting functions.

The compiler records data from numerous data input terminals in computer-compatible format tapes. The tapes are immediately available for computer analysis and permit the preparation of timely attendance reports. At the end of pay periods, attendance data are on hand for balancing to other labor reporting information. The system eliminates time and cost associated with editing and manual punching of time card information.

As another example of the utility of this invention, the sensing of card information is done for the purpose of receiving credit information concerning the holder of the card. For example, credit card information may be transmitted from a remote station data input terminal to a central station, and the central station may then send back authorization for a sale, and possible actually transfer funds from one account to another at the central station, based on information thus given.

However, the basic concepts referred to hereinabove require the provision of machines capable of reading the information source at a low cost. The machines must be foolproof in order that persons of all temperament and degrees of intelligence may use the machines without extensive instruction of operation, and the machine must be virtually indestructible.

Therefore, an object of this invention is to provide a low-cost, but fully reliable device for readout of data from a mechanical storage media with data in the form of surface variations.

Another object of the invention is to provide such device fully self-contained and requiring no selective operator control or assistance.

Another object of the invention is to relate a card readout device sensing means to a reference surface portion of a card in the device, to establish a reference from which surface variations may be sensed.

Yet another object of the invention is to provide a sensing means in the form of a star wheel for detecting embossed coded data on a plastic card, and providing a circuit control as a function of detecting the coded data for directly controlling a remote station information center.

IN THE DRAWINGS

DESCRIPTION OF THE PREFERRED EMBODIMENT

Figure 1:
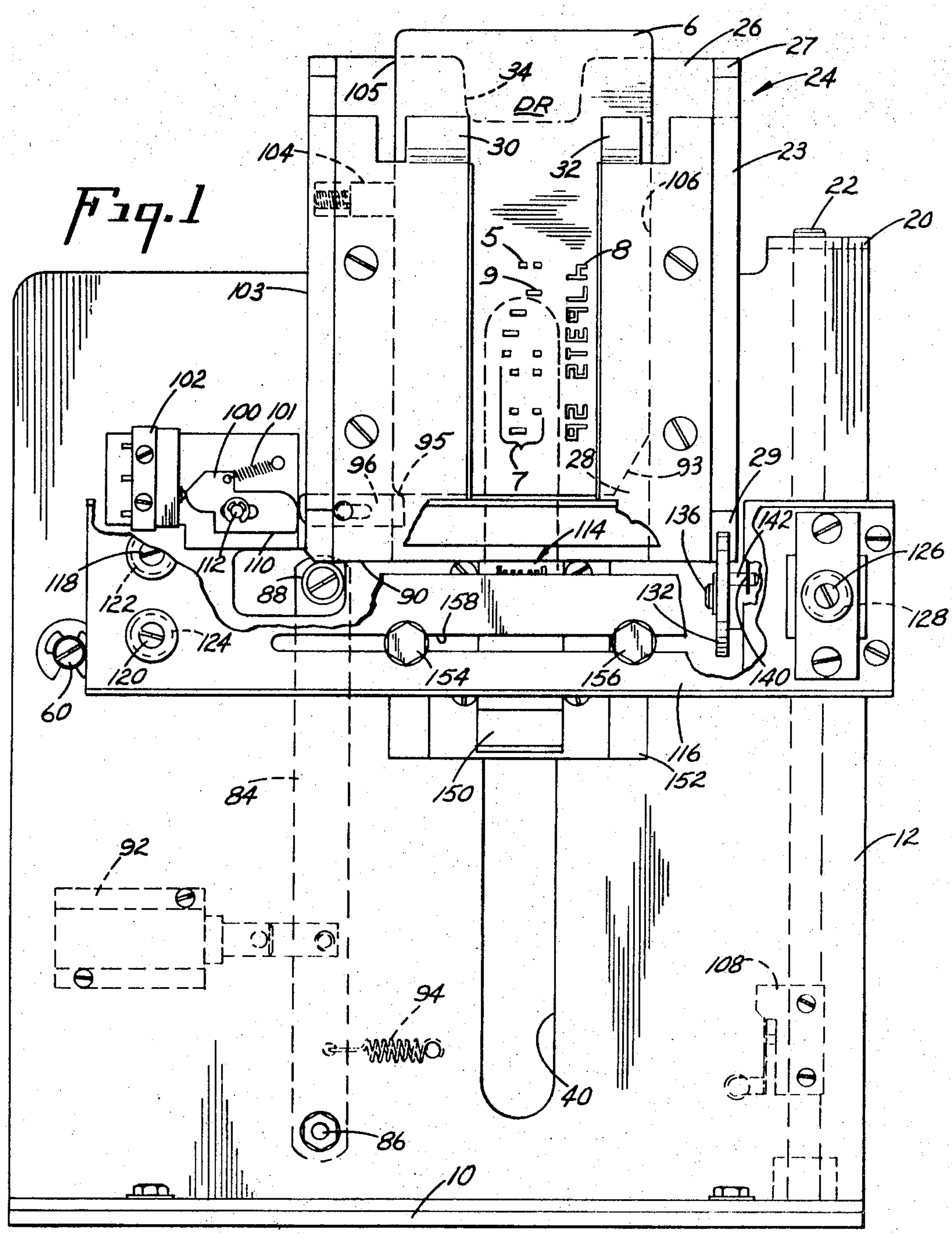
FIG. 1 is a front elevation, with the covers removed, of a code sensing device for circuit control constructed in accordance with the present invention and showing the parts in a neutral or start position.
Figures 2, 4, 5:
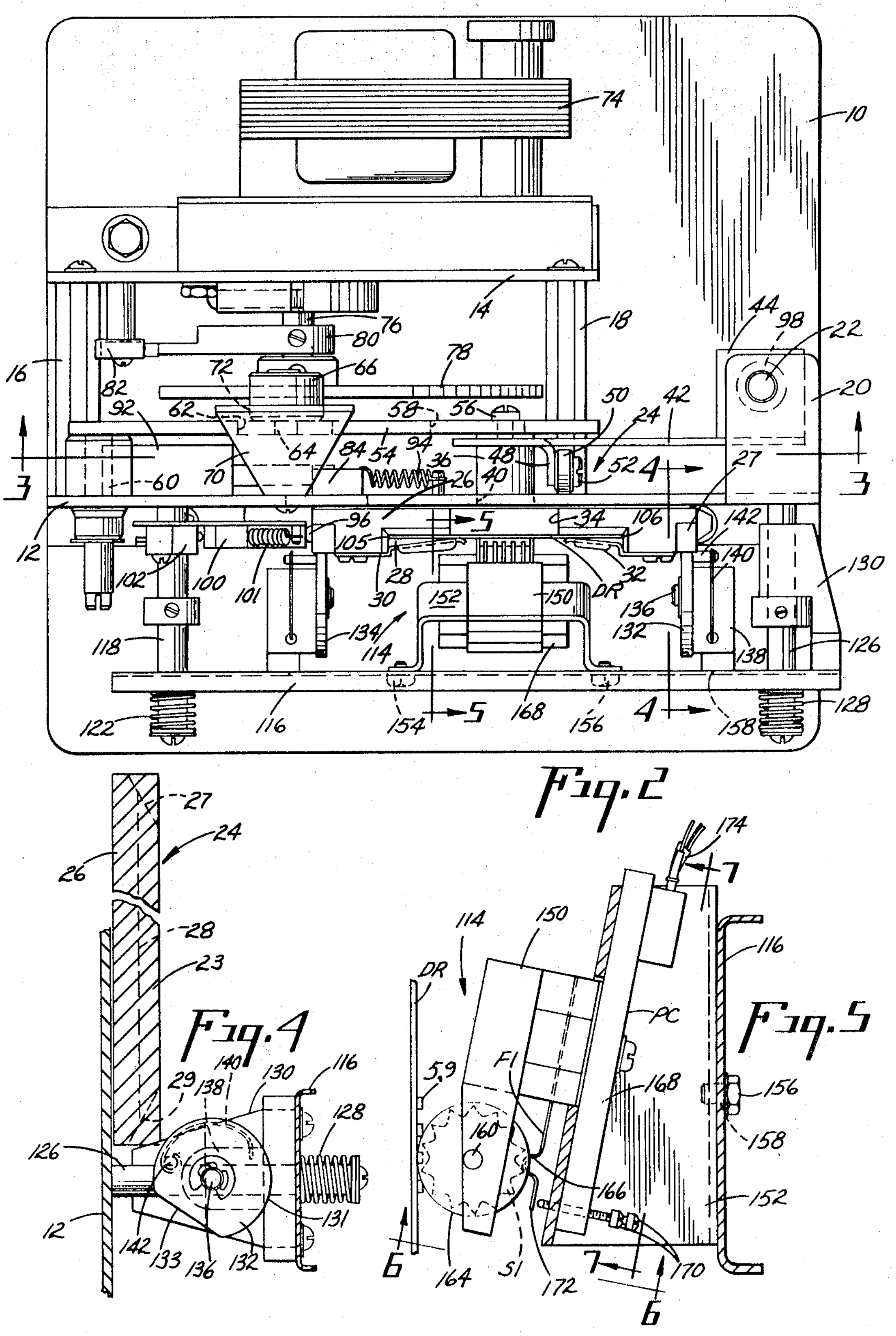
FIG. 2 is a plan view.
FIG. 4 is a section taken on line 4—4 of FIG. 2.
FIG. 5 is a section taken on line 5—5 of FIG. 2, on an enlarged scale, showing a sensing head in a sensing position.
Figure 3:
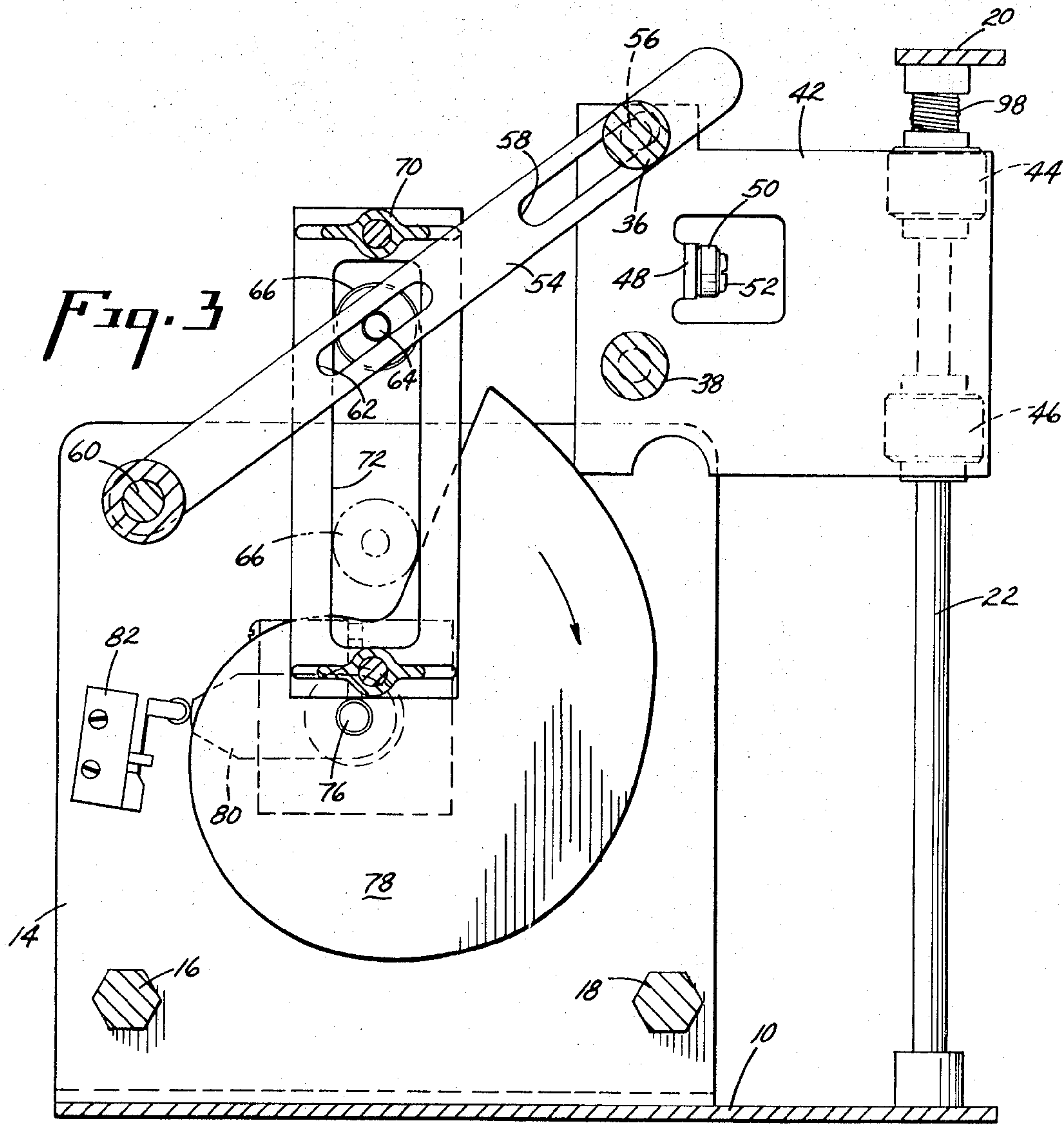
FIG. 3 is a section taken on line 3—3 of FIG. 2 showing a carriage drive mechanism.

As shown in FIGS. 1, 2 and 3, the device of the present invention includes a base 10, a front wall 12 and a rear wall 14. The walls are fastened to the base and secured to each other in spaced-apart relationship by tie bars 16 and 18.

A vertically movable carriage 24, seen about centrally of the FIG. 1, is guided in its travel by a rod 22. The rod 22 is mounted in a vertical position between an ear 20, projecting rearwardly from the top of wall 12, and the base 10. The carriage is the means by which a data card is carried through a work cycle, and in the illustrated embodiment it has the appearance of a vertical plate with an open face pocket as seen best at the top of FIG. 1.

The carriage 24 is also shown in FIG. 2 and includes a carriage bed 26 having the appearance of a vertical plate. The bed 26 is provided with a pair of resilient runners 30 and 32 secured to the face of the bed to form a pocket 28 for the reception of a data card DR. Also, the upper end of the bed is provided with a cutout area 34 to provide finger clearance for easy placement of the card into and removal from the carriage.

A pair of guide bosses 36 and 38 are secured to the rear face of the carriage bed 26 and project outwardly therefrom through an elongate opening 40 provided in the wall 12. Opening 40 is shown best in FIG. 1 where it appears in the lower central area of the wall. The carriage 24 is connected to a movable drive plate 42 by securing one end of the drive plate to the projecting ends of the bosses 36 and 38. The other end of the drive plate is provided with a pair of bearing blocks 44 and 46 fixed thereon, and the bearing blocks are slidingly supported on the guide rod 22 to permit vertical movement of the drive plate and the carriage.

If plate 42 were supported only by the blocks 44 and 46, the bed 26 could swing away from the wall 12. Therefore, the drive plate has an ear 48 extending outwardly from its front face for mounting a roller 50. The roller is supported on an eccentric screw 52 and is positioned to ride on the rear face of the wall 12 during motion of the drive plate. The screw 52 permits precise adjustment of the roller against the wall, and the roller stabilizes the drive plate for controlled movement on the guide rod 22 without binding.

In the preferred embodiment the carriage is manually depressed and mechanically returned. The return drive of the drive plate 42 is accomplished by a drive lever 54 as shown in FIGS. 2 and 3. The drive lever is mounted at one end on a shoulder screw 56 which extends through an elongate slot 58 in the drive lever 54 and secures the drive lever to the projecting end of the boss 36 on the drive plate 42. The other end of the drive lever is pivotally mounted on a pin 60 provided on the wall 12. The drive lever also includes another elongate slot 62 positioned intermediate the ends of the drive lever. A pin 64 extends through the slot 62 and rotatably supports a cam follower roller 66.

The carriage 24 is adapted for movement in a path from a home position shown in FIG. 1, to a lowered or actuated position not shown in the drawings, and return to the home position to perform a sensing cycle. The carriage is moved to the actuated position by gravity, which will be further described below, and is moved from the actuated to the home position by drive means now to be described.

With reference to FIGS. 2 and 3, a guide block 70 is fastened to the rear face of the wall 12. The guide block is provided with a cam slot 72 which receives the roller 66 mounted on the drive lever 54. Thus, and as will be further explained below, the elongate slots 58 and 62 in the drive lever 54 permit the drive lever to be pivoted in either direction about the pin 60, to thereby move the drive plate 42 and, of course, the carriage 24 in a vertical linear path.

The drive means comprises a motor 74 having a drive shaft 76. Mounted on the drive shaft are a drive cam 78 and a shutoff cam 80. With the carriage in the actuated position, the cam follower roller 66 rests on the dwell of the drive cam 78 as shown in phantom in FIG. 3. When the motor is activated, the cams 78 and 80 are driven in a clockwise direction as viewed in FIG. 3, and the drive cam 78 acting against the roller 66 pivots the drive lever 54 in a counterclockwise direction thereby raising the drive plate 42 and moving the carriage to the home position. As the cams complete one revolution, the cam 80 is effective to close a switch 82 which shuts off the motor.

The carriage is normally retained in the home position by a blocking means movable into and out of the path of the carriage. As shown in FIG. 1, the blocking means includes a link 84 pivotally mounted at one end on a pin 86 provided in the wall 12, and the other end of the link is provided with a roller 88 adapted to coact with a lower edge 90 of the carriage. A solenoid 92, mounted on the wall 12, is effective, when energized, to pivot the link 84 in a counterclockwise direction, as viewed in FIG. 1, to permit movement of the carriage to the actuated position. A spring 94 is provided to return the link to the position shown in FIG. 1 when the carriage is returned to the home position.

The movement of the carriage from the home to the actuated position is accomplished by actuator means responsive to insertion of a data card DR into the carriage. As best shown in FIG. 1, the carriage is provided with a slide member 96 which is contacted by a corner 95 of the data card as it is bottomed in the pocket 28 of the carriage, causing the slide member to be moved outwardly from the carriage. As the slide member is thus moved it acts against an actuator 100 causing it to move in the same direction, against the bias of a spring 101, to close a switch 102. Closing of the switch 102 is effective to energize the solenoid 92 which, in turn, pivots the link 84 in a counterclockwise direction withdrawing the roller 88 out from under blocking engagement with the lower edge 90 of the carriage.

The carriage is now free for movement and drops to the actuated position by gravity, assisted only by a compression spring 98 provided on the guide rod 22 between the ear 20 and the bearing block 44 as shown in FIG. 3.

As soon as the carriage moves downwardly far enough for the slide member 96 to bypass the actuator 100, the spring 101 urges the actuator against an edge 103 of the carriage and out of contact with the switch 102. Opening of the switch 102 deenergizes the solenoid 92 which has, up to this point, been holding the roller 88 out of the carriage path. However, the link 84 continues to be held out as a result of the roller 88 riding along the edge 103 of the carriage during the further travel of the carriage to the actuated position.

Upon reaching the actuated position the carriage closes a switch 108, FIG. 1, which energizes the motor 74. As described above, the motor, through the drive means 42, 54, 66 and 78, drives the carriage upwardly to the home position whereupon the motor is shut off by the switch 82 being acted upon by the cam 80.

As the carriage moves from the actuated to the home position, as soon as the lower edge 90 of the carriage bypasses the roller 88, the spring 94 is effective to restore the link 84 and the roller 88 to the blocking position shown in FIG. 1. Also at this time, the projecting end of the slide member 96 strikes a bottom surface 110 of the actuator 100, pivoting the actuator on a pin 112 in a counterclockwise direction (as viewed in FIG. 1) against the bias of the spring 101. The actuator is retained in this rotated position by the slide member until such time as the card DR is removed or partially withdrawn from the carriage. In this way, as long as the actuator 100 is in its rotated position, the carriage is prevented from being moved to the actuated position because the actuator is not in alignment for movement against the switch 102 by the slide member 96.

However, as the card is withdrawn from the pocket 28 of the carriage, only a distance sufficient for the lower corner 95 of the card to clear the slide member 96, the actuator 100 is rotated in the opposite direction under urge of the spring 101. This action pushes the slide member into the carriage to the position shown in FIG. 1. With the actuator and the slide member restored to the FIG. 1 positions, the unit is in condition for a subsequent operation.

As shown in FIG. 1, the carriage is also provided with a plunger 104 to effect registration of the card DR within the pocket 28. The plunger is positioned at one side of the pocket near the upper end thereof, and is spring loaded to act in a direction against an edge 105 of the card. As a card is placed into the pocket, the plunger acts against the card edge 105 and urges the card against an opposite side 106 of the pocket to accurately position the card for a sensing operation.

A sensing device is shown in FIGS. 1, 2, 4 and 5 and comprises a sensing head indicated generally at 114 mounted on a frame 116. The frame is adapted for movement towards the data card in the carriage to position the sensing head for a sensing operation when the carriage is moved from the actuated to the home position, and for movement away from the card to withdraw the sensing head therefrom when the carriage moves to the actuated position.

The frame 116 is supported at one end on a pair of pins 118 and 120 fixed in the wall 12 and, as best shown in FIGS. 1 and 2, is biased for movement on the pins towards the carriage by compression springs 122 and 124 provided on the pins 118 and 120 respectively. The other end of the frame is supported in a similar manner but only on a single pin 126 fixed in the wall 12. A spring 128 on the pin 126 also biases the frame for movement towards the carriage. Additionally, the frame is provided with a bearing element 130 for sliding movement on the pin 126 to assure rectilinear movement.

The frame 116 is moved in response to movement of the carriage 24 under control of a pair of cams 132 and 134 shown in FIGS. 1, 2 and 4. Because these cams and other elements related to their operation are identical, only the cam 132 and its related elements will be described hereinafter.

As best seen in FIG. 4, the cam 132 is contoured to provide a uniformly arcuate lobe 131, and a straight section or flat dwell 133. The cam is supported on a pin 136 provided in a support member 138 affixed to the frame 116. The cam is positioned to be acted upon by a marginal surface 23 of the carriage 24, and the surface 23 is provided at its upper end with an angled face 27 (See FIG. 4) and at its lower end with an angled face 29. A torsion spring 140 is secured at one end to a pin 142 in the cam and at the other end to the support member 138 to bias the cam in a counterclockwise direction as viewed in FIG. 4.

As the carriage 24 moves from the home to the actuated position, and with the cam biased by the spring 140, the lobe 131 of the cam is positioned to ride on and be acted upon by the surface 23 of the carriage. Thus the cam 132 and, of course, the frame 116 and the sensing head 114 are forced outwardly, or to the right as viewed in FIG. 4, against the bias of the springs 122, 124 and 126. As the carriage is returned from the actuated to the home position, the angled face 27 engages the cam 132 and rotates it in the opposite direction against the bias of the torsion spring 140, thereby presenting the dwell 133 of the cam to the surface 23. In this position the springs 122, 124 and 126 are effective to move the frame 116 and the sensing head 114 a controlled distance towards the carriage as governed by the dwell 133 of the cam being urged against the surface 23 of the carriage by the springs.

As the carriage reaches the home position, and the angled face 29 is opposed the cam 132 to provide clearance for rotation of the cam, the torsion spring 140 rotates the cam to the position shown in FIG. 4 and the frame 116 and the sensing head 114 are moved further in the direction of the carriage (to the left as viewed in FIG. 4) under urging of the compression springs 122, 124 and 126. This action restores the parts to their original positions in condition for a subsequent sensing operation.

Referring to the data card DR shown in FIG. 1, the reference character 6 indicates a portion of the data or credit card having a smooth, planar surface with identification symbols 8, which are numerical symbols in this illustration.

An arbitrary portion of the card surface aligned with each symbol is reserved for embossing of a bar-code representing the particular symbol. This card portion will be referred to as a column, although the column is not all embossed or otherwise employed. The portion of the card DR in FIG. 1 is about normal full size, and the length of column used is indicated by a bracket 7.

In one common card code system, which has been selected for illustration of this invention, the column is divided into five possible portions, and two out of the five are embossed in order to provide a bar-code representative of the particular symbols. The use of this embossed code in the past has been to serve as a printing plate for imprinting a charge form with both human and machine sensible printing.

The column area associated with each of the symbols 8 is divided into a plurality of segments, and each segment may be altered from the planar surface 6 to form an embossed bar-code 5, generally referred to as a "bit." The column length within the bracket 7 will provide a plurality of such bits. Then, by choosing a combination of two such bits, for example, a code may be established which will identify a particular symbol 8 to a physical sensing device. This type of bit sensing is known and used with readout devices of various kinds.

This invention provides physical sensors for direct reading of the information from a card, and makes possible the efficient reading of the bits within the limited width indicated by the bracket 7. The columns of bits are in lateral relationship with one another, and produce a data band along the card. It should be noted that the individual bits of information on the credit card DR may run together and form a longer bar such as the bar 9 shown in FIG. 1.

Figure 6:
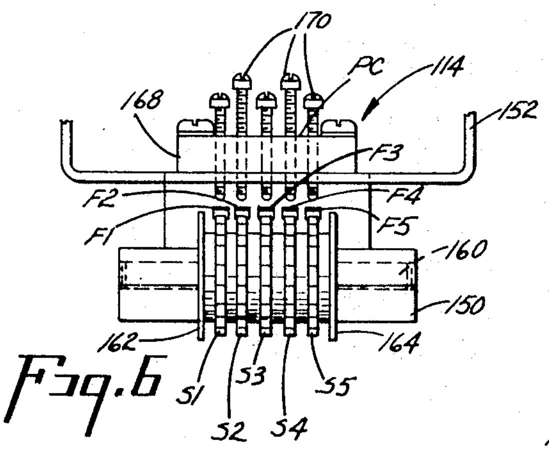
FIG. 6 is a detail of the sensing head as viewed substantially from the line 6—6 of FIG. 5.
Figure 7:
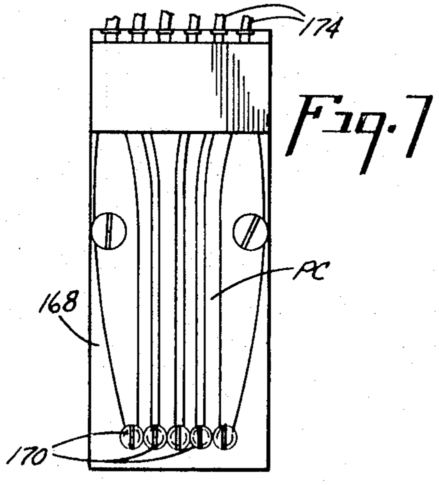
FIG. 7 illustrates a printed circuit control of the sensing head as viewed substantially from the line 7—7 of FIG. 5.

The sensing head 114 is best shown in FIGS. 5, 6, and 7, and comprises a mounting block 150 for supporting a plurality of star or sensor wheels S1–S5, there being one sensor wheel for each of the possible five positions of the bar-codes. The mounting block is secured to a bracket 152, and the bracket is fastened to the frame 116 by screws 154 and 156. As shown in FIG. 1, the screws 154 and 156 are supported in an elongate slot 158 in the frame 116 to permit lateral adjustment of the sensing head 114 with respect to the coded data on the card in the carriage 24.

The sensor wheels S1–S5 are coaxially and rotatably supported in spaced apart relation on a shaft 160 provided in the mounting block 150. The peripheries of the sensor wheels are provided with pointed teeth of uniform configuration as shown in FIG. 5, and are dimensioned such that the teeth are adapted to engage the bar codes 5, 9 but are spaced from the surface 6 of the credit card. The sensor wheel array is provided with a disc 162 at one end, and a disc 164 at the other end, both rotatably supported on the shaft 160, having slightly larger diameters than the sensor wheels. These discs are designed to ride on the surface 6 of the credit card in the areas outside the bar-code and, in the event that the card being sensed is bowed or warped, the discs are effective to straighten or flatten the card and maintain proper spacing between the sensor wheels and the coded data being sensed.

The mounting block 150 also includes an element providing a series of projecting spring fingers F1–F5, one for each of the sensor wheels S1–S5. The fingers extend in a direction towards the sensor wheels, and each of the fingers F1–F5 is provided with a detent 166 arranged to ride on the toothed periphery of a corresponding sensor wheel.

A base portion 168 of the mounting block 150 includes a series of conductor members in the form of screws 170, one for each of the fingers F1–F5, threaded into plated holes in the base portion 168 and extending into proximate relation to an end 172 of a corresponding finger. The screws 170, and a printed circuit PC provided on the base portion 168, are adapted to complete a circuit path to output terminals 174 in response to sensing of the bar-codes by the sensor wheels. Thus, as the card DR is moved past the sensor wheels, the bar-codes on the card engage and incrementally rotate the sensor wheels. As a sensor wheel is rotated, the toothed periphery acts against the detent 166 of a finger F1–F5, flexing the finger and urging the end 172 thereof into contact with a screw 170. This action completes an electrical circuit through the printed circuit PC and establishes an output signal representative of the specific locations of the bar-code on the credit card. Manifestly, those sensor wheels not engaged by bar-codes are not rotated and, therefore, do not act on the detent 166 to complete a circuit.

An overall description of the operation of the novel device of the present invention will now be given, starting with the parts being in their neutral or home positions shown in FIG. 1. The credit card DR is placed in the carriage 24, with the embossed data facing the sensing head 114, and is pushed downwardly until it is bottomed in the carriage and the corner 95 of the card acts against the slide member 96. One corner of the card is preferably notched as at 93 to prevent operation of the unit if the card is incorrectly positioned in the carriage.

The action of the card on the slide member is effective to move the actuator 100 against the switch 102 which, in turn, energizes the solenoid 92 which pivots the link 84 to withdraw the roller 88 out of blocking engagement with the carriage. The carriage now falls by gravity against the base 10. As the carriage is moving downwardly, it coacts with the cams 132 and 134 which urge the frame 116 and the sensing head 114 outwardly from the card, against the bias of the springs 122, 124 and 126, to maintain the sensor wheels S1–S5 out of engagement with the data card. Also during this movement, the carriage pivots the drive lever to its lowered position in the guided path provided by the guide block 70. As soon as the slide member clears the actuator, the spring 101 retracts the actuator from the switch 102 thereby deenergizing the solenoid 92. However, the link 84 and the roller 88 continue to be held in a nonblocking position away from the carriage as a result of the roller 88 riding along the edge 103 of the carriage.

The carriage upon reaching the bottom of its travel activates the switch 108 which energizes the motor 74. The motor, then, rotates the drive cam 78 through a single revolution whereafter the motor is shut off by the cam 80 closing the switch 82. During rotation of the drive cam, the drive lever is pivoted in the opposite direction as a result of the follower roller 66 riding on the cam, thereby driving the carriage upwardly towards the FIG. 1 position. As the carriage travels upwardly it rotates the cams 132 and 134 so as to present the dwell 133 thereof against the carriage, causing the frame 116 and the sensing head 114 to be moved towards the data card under the influence of the springs 122, 124 and 126. In this position of the sensing head, the sensor wheels S1–S5 are engaged and rotated by the bar-codes 5, 9 on the data card to complete a circuit through the fingers F1–F5, the screws 170, and the printed circuit PC to the output terminals 174.

When the carriage reaches the home position, the cams 132 and 134 leave engagement with the carriage and are restored to the FIG. 4 position under the biasing of the springs 140. Also at this time, the spring 94 returns the link 84 so as to position the roller 88 in blocking engagement with the lower edge 90 of the carriage. In the movement of the carriage to the home position, the slide member 96 strikes the bottom surface 110 of the actuator 100 and pivots the actuator in a counterclockwise direction as viewed in FIG. 1 against the bias of the spring 101. Thereafter the carriage cannot be moved through a sensing cycle, because the actuator is not in a position to be acted upon by the slide member, until the card is partially withdrawn and reinserted or replaced by another card to be sensed. Thus, as the card is withdrawn from the carriage, and the corner 95 of the card leaves engagement with the slide member, the actuator is rotated in the opposite direction under the influence of the spring 101. This rotation of the actuator and action of the spring move the slide member inwardly of the carriage, thereby repositioning both the slide member and the actuator to the FIG. 1 positions in condition for a subsequent operation.

The card reader of the present invention, as stated supra, is adapted to transmit a signal pulse of the sensed data to a remote station information center for directly controlling a data gathering means such as a processor, compiler, or computer. In a typical application, a single processor would be controlled by a plurality of card readers located at various stations. Accordingly, since the processor can only accept data from one reader or data input terminal at a time, circuit means is provided for delaying the sensing operation of the card reader for a subsequent sensing cycle in those instances wherein the processor is still under control of data being transmitted by a card reader from an immediately preceding sensing operation.

Thus, if the processor is not in a cleared condition to accept a signal pulse from a data input terminal, the circuit means is effective to delay activation of the card reader. This may be accomplished by delaying the movement of the carriage from the home to the actuated position or, alternately, by delaying the return movement of the carriage from the actuated to the home position until the processor is in a condition to accept the signal pulse.

Figure 8:
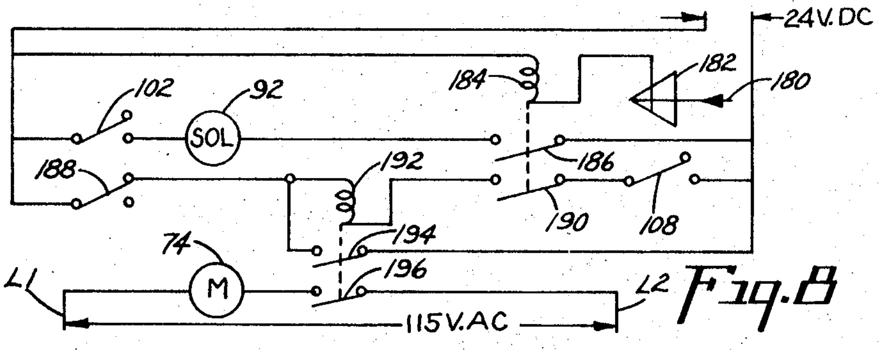
FIG. 8 is a schematic wiring diagram of the electrical system of the machine.

The circuit means will be described with reference to the schematic wiring diagram of FIG. 8. The switch 102 is energized by insertion of a data card in the carriage. A signal is received on a line 180 from the processor unit. The signal operates a relay driver 182 which energizes a poll or ready relay 184. Contacts 186 of the ready relay 184, in conjunction with the switch 102, activate the solenoid 92 to initiate release of the carriage for its gravity descent to the actuated position.

As the carriage moves downwardly it disengages from a switch 188 allowing the switch to swing to its normal or closed position. When the carriage reaches the actuated position, it activates the switch 108. Switch 108 is in series with ready relay contacts 190 (activated when the relay 184 is energized) and the switch 188, and is effective to energize a motor relay 192. Relay contacts 194 of the motor relay 192, in parallel with the switch 108 and the ready relay contacts 190, hold the motor relay 192 energized until the switch 188 is opened by the carriage reaching the home position. Motor relay contacts 196 operate the motor 74 during the portion of the cycle that the motor relay 192 is actuated.

From the foregoing it will be seen that the poll or ready relay 184 is effective to prevent or delay operation of the sensing operation until such time as it is energized by a signal 180 from the processor unit. The circuit, as described above, may be arranged to delay movement of the carriage from the home position or, if desired, the contacts 186 may be removed, in which case the solenoid 92 immediately drops the carriage. Relay driver 182 will delay movement of the carriage from the actuated to the home position through relay contacts 190 until the processor is ready to receive data.

From the foregoing, it will be appreciated that the present invention provides a compact data input terminal for sensing coded data on a data card and producing an output for controlling auxiliary equipment at a remote station. The device is reliable in operation, easy to operate and relatively inexpensive to manufacture.

What is claimed is:

1. A circuit control device for sensing physical variations of a data card surface comprising:
- a carriage for accepting a data card in upright position;
- means for guiding the carriage for movement in a vertical path between an upper home position and a lower actuated position, said carriage being free to fall by gravity to the lower position;
- blocking means movable between a first position supporting the carriage in the upper position and normally preventing movement thereof by gravity to the lower position, and a second position for permitting such movement of the carriage;
- actuator means operable in response to placement of a data card in the carriage for moving the blocking means to the second position and allowing the carriage to move by gravity from the upper to the lower position;
- electric power means for driving the carriage from the lower position to the upper position;
- sensing means for detecting arrival of the carriage at the lower position and activating the power means;
- sensing means for detecting card surface variations and generating at least one signal pulse as a function of the surface variations in response to movement of the carriage towards the upper position; and
- means for restoring the blocking means to its first position in response to the carriage reaching the upper position.

2. A circuit control device as set forth in claim 1 in which the card sensing means is positioned adjacent the path for detecting, by contact, card surface variations, said sensing means being normally at a nonsensing position spaced from the path of a data card on the carriage so as to be out of contact with the surface of a passing card on the carriage;
- means for moving the sensing means into a card sensing position in response to initial movement of the carriage towards the upper position; and
- means for restoring the sensing means to the nonsensing position whenever the carriage reaches a predetermined upper location.

3. A circuit control device as set forth in claim 2 in which the means for moving and restoring the card sensing means comprises:
- biasing means normally urging the card sensing means towards the card sensing position; and
- cam means carried by the card sensing means and normally disposed in a first position for contact with the carriage to cam the sensing means out of the card sensing position in opposition to the biasing means whenever the carriage is moving downwardly, and pivotable to a second position in response to upward movement of the carriage for permitting the card sensing means to move into the card sensing position under the influence of the biasing means.

4. A circuit control device as set forth in claim 1 which further provides for transmission of said at least one signal pulse to a remote station information center comprising:
- circuit means for polling the condition of the information center to accept a signal pulse prior to movement of the carriage from its lower to its upper position, said circuit means being associated with the actuator means for delaying movement of the carriage to its upper position whenever the information center is not in condition to accept the signal pulse, and for permitting movement of the carriage to its upper position whenever the information center is in a condition to accept the signal pulse.

5. A circuit control device for sensing physical variations of a data card surface comprising:
- a carriage for a data card, said carriage having a card position and being movable between a home and an actuated position;

sensing means movable between a nonsensing position spaced from the card position of the carriage and a sensing position for detecting, by contact, card surface variations;

biasing means normally urging the sensing means towards the sensing position; and cam means carried by the sensing means and normally disposed in a first position for contact with the carriage to cam the sensing means out of the card sensing position in opposition to the biasing means whenever the carriage is moving towards the actuated position, and shiftable to a second position in response to movement of the carriage towards the home position for permitting the sensing means to move into the sensing position under the influence of the biasing means.

6. A circuit control device as set forth in claim 5 in which the cam means has an arcuate lobe and a straight dwell, and is mounted on the sensing means for pivotal movement between the first position in which the lobe is disposed for contact by the carriage whenever the carriage is moving towards the actuated position, and the second position in which the dwell is disposed for contact by the carriage whenever the carriage is moving towards the home position;

spring means normally urging the cam member to the first position;

said carriage acting against the cam lobe in its first position to cam the sensing means to the nonsensing position during movement of the carriage towards the actuated position, and being effective to pivot the cam member against the bias of the spring means to its second position with the dwell in contact with the carriage for permitting the sensing means to move into the sensing position during initial movement of the carriage from the actuated to the home position;

said spring means being effective to restore the cam member to its first position in response to the carriage reaching the home position.

7. A sensing device for sensing physical variations on the surface of a data card on a card support and generating at least one signal pulse as a function of the surface variations comprising:

a card sensing means including a plurality of star-shaped sensor wheels rotatably mounted in a coaxial array, said sensor wheels having a fixed axes parallel to the card surface, and the sensor wheels being spaced from the card surface but engageable by the physical variations of the card surface for imparting rotation to the sensor wheels when the card support and the card sensing means are moved relative to each other parallel to the card surface;

a flexible detent finger associated with each of the sensor wheels urged into engagement with the periphery of the sensor wheel and carrying electrical contact means; and a conductor member associated with each of the detent fingers in spaced relation therewith but adapted to be contacted by the contact means on the detent finger when deflected by a tooth of the corresponding sensor wheel, whereby rotation of anyone of the sensor wheels flexes the corresponding detent finger into contact with the corresponding conductor member to thereby generate a signal pulse.

* * * * *